Dec. 2, 1924.
A. J. TORZEWSKI
ANTISKID DEVICE
Filed Feb. 26, 1924
1,517,766
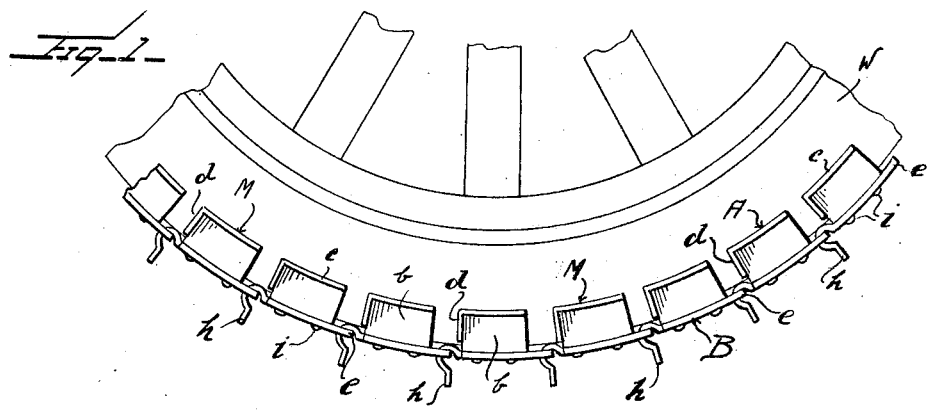
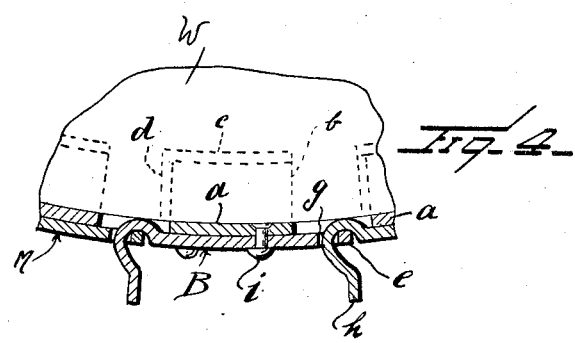
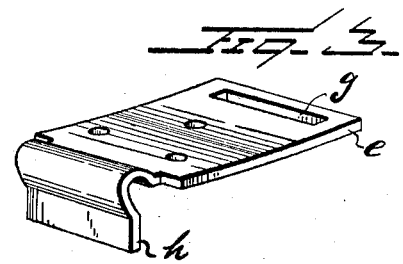
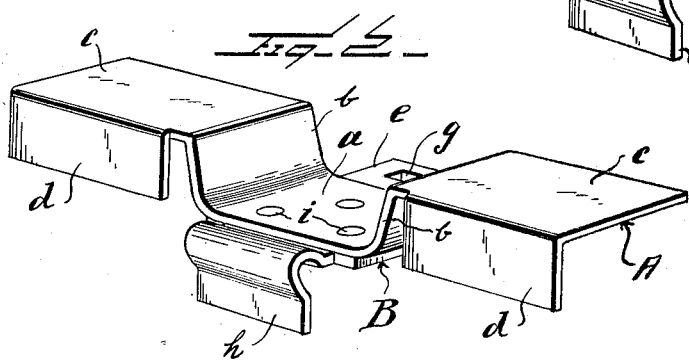
INVENTOR.
A. J. Torzewski
BY
Watson E. Coleman
ATTORNEY.

Patented Dec. 2, 1924.

1,517,766

UNITED STATES PATENT OFFICE.

ADOLPH J. TORZEWSKI, OF RINGLE, WISCONSIN.

ANTISKID DEVICE.

Application filed February 26, 1924. Serial No. 695,321.

*To all whom it may concern:*

Be it known that I, ADOLPH J. TORZEWSKI, a citizen of the United States, residing at Ringle, in the county of Marathon and State of Wisconsin, have invented certain new and useful Improvements in Antiskid Devices, of which the following is a specification, reference being had to the accompanying drawings.

This invention relates to certain improvements in anti-skid devices and has particular relation to devices adapted to be applied circumferentially to tired wheels, the object of which is to provide means whereby the wheel may be raised above the ground and skidding or slipping effectively eliminated.

Another object of the invention is to provide a novel device of this character having means whereby sinking of the wheels in soft mud, sand, or snow may be prevented and the wheel aided in obtaining an effective tractive contact with the substance traversed.

A further object of the invention is to provide a device of this character which shall be efficient, durable, simple in construction, easily applied to and removed from the tire of a wheel, and which may be quickly and cheaply manufactured.

When, as shown in the accompanying drawing, the members are applied to the pneumatic tire of an automobile, or other vehicle, the device serves also as a tread armor, thereby preventing tacks, glass, or foreign matter from coming into contact with the tire.

With these and other objects in view which will become apparent from the following description, this invention comprises a plurality of interchangeable members adapted, when linked together, to form a complete covering for the tread surface of a tire, said members having formed on their tread surfaces anti-skidding calks and projecting from their side walls anti-skidding and anti-sinking means.

The invention consists in the details of construction and in the combination and arrangement of the several parts of my improved anti-skid device whereby certain important advantages are attained and the device rendered simpler, less expensive, and otherwise more convenient and advantageous for use as will be hereinafter more fully set forth.

The novel features of my invention will hereinafter be definitely claimed.

In order that the invention may be the better understood, I will now proceed to describe the same with reference to the accompanying drawings, wherein it will be understood that various changes and modifications may be made as to the detailed construction and arrangement of parts without departing from the spirit of the invention as hereinafter claimed, and in which drawings:—

Figure 1 is a segmental side elevation illustrating an anti-skid device constructed in accordance with an embodiment of my invention in applied position;

Figure 2 is an enlarged perspective view of one of the members;

Figure 3 is an enlarged perspective view of the section B;

Figure 4 is a cross-sectional view of one of the members in applied position.

As disclosed in the accompanying drawing, my improved device comprises a plurality of separable members M disposed circumferentially of the wheel W when in applied position. As the members M are of similar structure, it is believed a detail description of one is sufficient for the purpose of disclosure.

Each of the members M comprises an inner section A normally disposed between the tire tread and the outer section B. The section A is constructed from a single piece of metal so shaped as to provide a central portion $a$ which bears directly against the outer surface of the tire and which has sufficient concave curvature to enable it to fit snugly to the tire tread. The extremities of the portion $a$ are continued by the portions $b$ bent in toward the wheel on such curves as will conform to the cross sectional contour of the side surfaces of the tire upon which the member is to be used. The end portions $b$ are continued by the plates $c$ at right angles to the portions $b$ and projecting outward from the opposite sides of the wheel. A side margin of each of the plates $c$ is substantially defined by a directed flange $d$ projecting at right angles to the plates $c$.

The outer section B comprises a rectangular plate having close contact with the outer surface of the portion $a$ of the section A, the section B having a width approximately equal to that of the portion $a$ but being of a length to extend beyond one side of the portion $a$. The extended portion $e$ of the section B has a transverse slot $g$. The opposite end of the section B is provided with an outwardly disposed lip or flange h of a width equal to the length of the slot g. The inner portion of the lip or flange h, or that portion of the flange working in the slot g, is arcuate in cross section, the free end portion of the flange h constituting a calk.

The section B is secured to the portion a of section A by rivets i or other suitable means, care being taken to smooth out that part of the securing means which will bear against the tire tread.

In applying my device to a wheel carrying a pneumatic tire, the tire is first deflated, then encased around its entire circumference with the interlocking members in which the slot g of each member is fitted over the projecting lip h of the adjacent member, and finally inflated. The curvature of the portions a will conform to that of the outer circumference of the inflated tire, that of portions b will tend to grip the side walls of the tire, and the expansion of the tire will take up all slack between the interlocking connections, thereby providing a self-contained means of securing the device in operative position.

While the accompanying drawing shows the device applied to a wheel fitted with a pneumatic tire, it is obvious that it may be used with equal effect on a vehicle wheel of any character.

In normal operation, the lip h bears against the ground, thus tending to keep the wheel raised out of contact therewith and providing an anti-skid or anti-slip calk. When the vehicle is being propelled through mud, sand, or snow the side flanges c enlarge its downward bearing surface and thereby prevent sinking of the wheel, while the projections d cut into the soft substance, giving an increased tractive grip to the wheels.

I claim:—

1. An anti-skid device comprising a plurality of interconnected members, said members being composed of two sections rigidly secured together, the outer section of each member having longitudinal extensions formed at opposite ends thereof, one of said extensions being provided with a transverse slot and the other being bent away from said member to provide a projecting lip, said lip to provide linking engagement with the transverse slot of the adjacent member and to project through said slot to further provide a ground engaging calk.

2. In combination, an anti-skidding and anti-slipping device comprising a plurality of pivotally connected members adapted to be disposed circumferentially around the tread of a wheel, said members having plates projecting from the sides thereof, said plates being adapted to provide supporting surfaces and having ground engaging means provided thereon, said pivotal connection being provided by a lip flange of one member engaging a slot of the adjacent member and extending therethrough to provide additional ground engaging means.

3. In an anti-skid device comprising a plurality of members adapted to be disposed circumferentially around the tread of a wheel, each of said members having plates extending from the sides thereof to provide supporting surfaces, each of said members at the central portion thereof being provided at one end with an outstanding lip, the opposite end of the member being provided with a slot, the lip of each member being insertible through the slot of an adjacent member whereby said adjacent members are pivotally connected, the outer portion of the lip providing a calk, the inner portion of the lip being arcuate.

4. In an anti-skid device comprising a plurality of members adapted to be disposed circumferentially around the tread of a wheel, each of said members having plates extending from the sides thereof to provide supporting surfaces, each of said members at the central portion thereof being provided at one end with an outstanding lip, the opposite end of the member being provided with a slot, the lip of each member being insertible through the slot of an adjacent member whereby said adjacent members are pivotally connected, the outer portion of the lip providing a calk, the inner portion of the lip being arcuate, said lip being disposed beyond the member.

5. In an anti-skid device comprising a plurality of members adapted to be disposed circumferentially around the tread of a wheel, each of said members having plates extending from the sides thereof to provide supporting surfaces, each of said members at the central portion thereof being provided at one end with an outstanding lip, the opposite end of the member being provided with a slot, the lip of each member being insertible through the slot of an adjacent member whereby said adjacent members are pivotally connected, the outer portion of the lip providing a calk, the inner portion of the lip being arcuate, each of the members being provided with an outstanding flange.

6. In an anti-skid device comprising a plurality of members adapted to be disposed circumferentially around the tread of a wheel, each of said members having plates extending from the sides thereof to provide supporting surfaces, each of said members at the central portion thereof being provided at one end with an outstanding lip, the opposite end of the member being provided with a slot, the lip of each member being insertible through the slot of an adjacent member whereby said adjacent members are pivotally connected, the outer portion of the lip providing a calk, the inner portion of the lip being arcuate, each of the members being provided with an outstanding flange adjacent to a side margin thereof and extending therealong.

7. In an anti-skid device comprising a plurality of members adapted to be disposed circumferentially around the tread of a wheel, each of said members having plates extending from the sides thereof to provide supporting surfaces, each of said members at the central portion thereof being provided at one end with an outstanding lip, the opposite end of the member being provided with a slot, the lip of each member being insertible through the slot of an adjacent member whereby said adjacent members are pivotally connected, the outer portion of the lip providing a calk, the inner portion of the lip being arcuate, each of the members being provided with an outstanding flange adjacent to a side margin thereof and extending therealong, said flange being at the same side of the member as the lip.

8. A device of the class described comprising a plurality of members adapted to be disposed circumferentially around the tread of a wheel, the central portion of each of the members being provided at one side with an outstanding lip, at the opposite side a slot, the lip of one member being insertible through the slot of an adjacent member, the outer portion of the lip constituting a calk.

In testimony whereof I hereunto affix my signature.

ADOLPH J. TORZEWSKI.